United States Patent [19]
Said

[11] Patent Number: 5,265,892
[45] Date of Patent: Nov. 30, 1993

[54] FOLDING CART CHAIR

[76] Inventor: Brian R. Said, 1544 Cypress Dr. #14, Jupiter, Fla. 33469

[21] Appl. No.: 47,335

[22] Filed: Mar. 19, 1993

Related U.S. Application Data

[63] Continuation-in-part of Ser. No. 694,340, May 1, 1991, abandoned.

[51] Int. Cl.⁵ .......................... B62B 1/20; B62B 1/24
[52] U.S. Cl. ..................... 280/30; 280/654; 280/659; 280/47.18; 280/47.26; 280/47.33; 280/10; 297/129
[58] Field of Search ............ 280/30, 47.18, 47.25, 280/47.26, 47.33, 645, 648, 649, 650, 652, 654, 659, 10; 297/1, 118, 129

[56] References Cited

U.S. PATENT DOCUMENTS

| | | | |
|---|---|---|---|
| 2,589,376 | 3/1952 | Harmsen | 280/47.33 X |
| 3,285,654 | 11/1966 | Cramer | 297/129 X |
| 3,403,922 | 10/1968 | Francis | 280/645 |
| 3,726,535 | 4/1973 | Longato | 280/47.18 X |
| 3,997,213 | 12/1976 | Smith et al. | 280/652 X |
| 4,323,260 | 4/1982 | Suchy | 280/47.25 |
| 4,362,308 | 12/1982 | Hicks et al. | 280/645 X |
| 4,533,151 | 8/1985 | Maitland | 280/30 X |
| 4,565,382 | 1/1986 | Sherman | 280/47.29 X |
| 4,645,262 | 2/1987 | Furubotten | 280/47.29 X |
| 4,712,803 | 12/1987 | Garcia | 280/652 X |
| 4,824,127 | 4/1989 | Stamm | 280/47.331 |
| 4,824,137 | 4/1989 | Bolden | 280/652 |
| 4,824,167 | 4/1989 | King | 280/30 X |

FOREIGN PATENT DOCUMENTS 2113622  8/1983  United Kingdom ............... 280/652

Primary Examiner—Brian L. Johnson

[57] ABSTRACT

The flexible cargo container of this cart partially deflects inside-out as the cart truss supporting it changes orientation pivoting on wheels rotatably mounted at the aft lower extremity of downwardly projecting support struts to serve as a chair. Leg supports providing static stability are pivotably mounted to extend forward thereby resisting tipping moments about the wheel axle with payload located intermediate thereto. Rotation of the forward end of the cart upwardly and rearwardly brings the rearward upper connect strut in contact with the support surface exposing the underside of the flexible container inverted to concavity, resulting in a chair of supine positioning. Support struts making up the truss fold about pivotable connections yielding a non-use flat geometry for storage. Snap releasable interconnections dissociate struts from the truss in further disassembly.

16 Claims, 14 Drawing Sheets

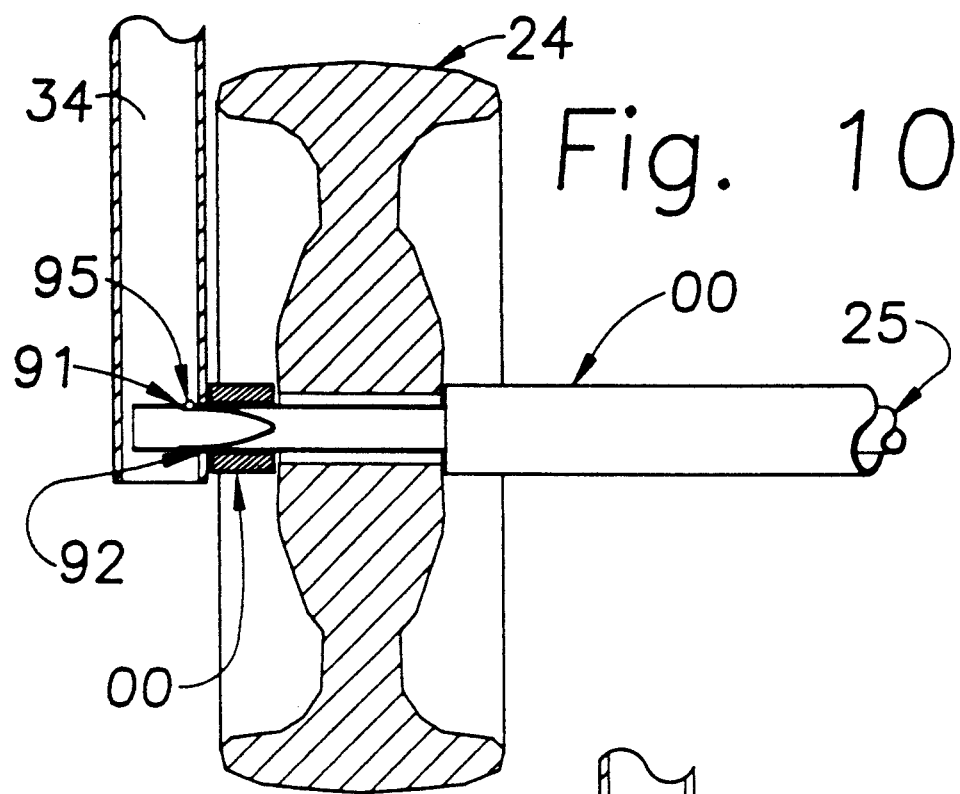
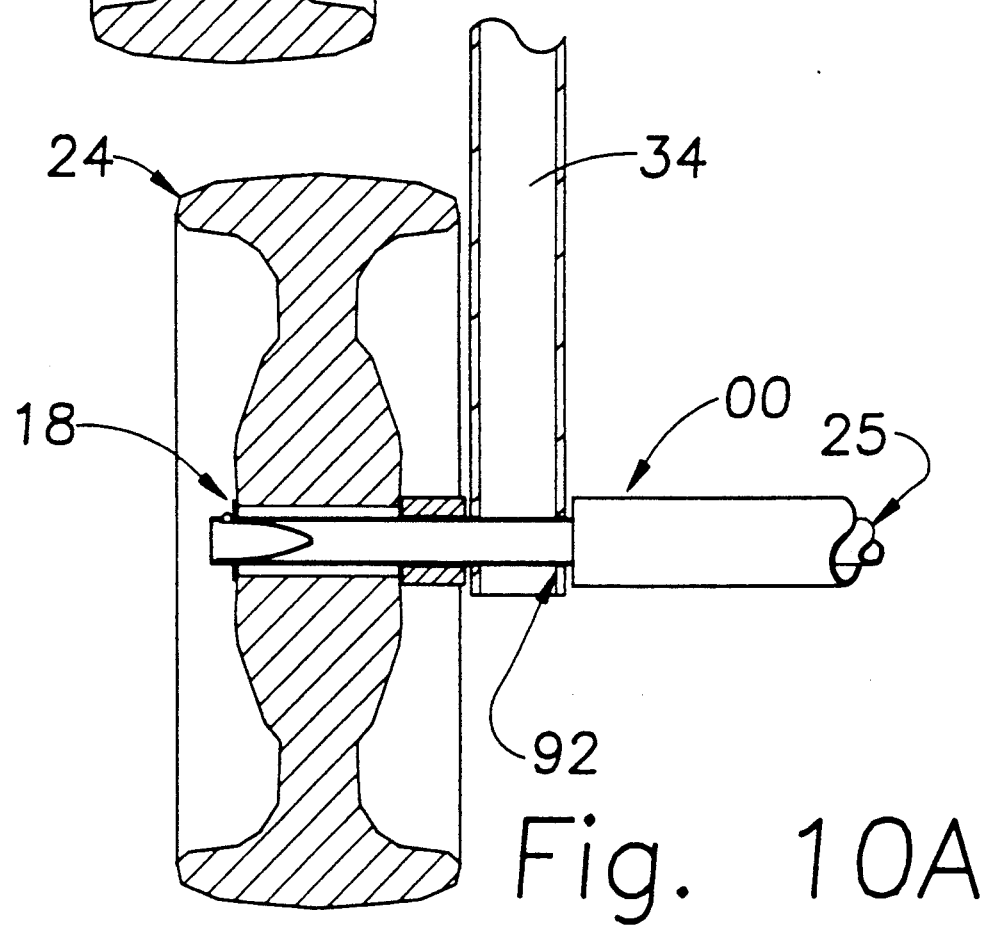

FOLDING CART CHAIR

This application is a continuation in part of application Ser. No. 07/694,340 filed on May 1, 1991, now abandoned.

TECHNICAL FIELD

Increased personal mobility results in a need for instruments, weapons, and the like, critical in support functions to business, recreation, exploration, research, rescue, and war. The present invention describes a collapsible, portable structure which may serve as a cart under external propulsion, and a load supporting truss unit when in stationary position, and when several are combined in a modular linkage.

BACKGROUND

Although various carriers, carts, and wheeled chairs and tables are reported, none have the combined versatility of this invention. Limitations exhibited in previous art include: load capacity, loading geometry, compromised comfort, heavy weight, limited mobility, and complexity of operation.

Folding chairs of prior art compromise strength to weight ratio, with much greater complexity. The described invention maximizes strength to weight ratio, and serves as a chair when tipped to re-orient the unit structure. The structural geometry of the chair is identical to that of the cart and functions to support sitting when the cart is tilted around it's axle to the equilibrium position where the cart's top-back edge shares chair loads with the wheels. Structural supports remain consistent to their orientation as a cart, while the flexible cargo container assumes the partially deflected inside-out geometry of a sling when loaded by sitting. The cart/chair structure geometry is suitable for construction of materials considered softer than alloys, so that it will not scratch expensive finishes on yachts, cars, and the like. This geometry also provides that noncorrosive materials which are often weaker than metals will also provide a superior load bearing structure.

Prior configurations of carts have been largely impractical with unstable rolling dynamics. Their use has been limited to use on flat, hard, smooth surfaces. The invention described herein provides compensation for irregular, soft surfaces, while remaining stable over a rolling speed range from walking pace to that of a vehicle trailer. The center of gravity is located forward of the lateral reaction vector of the wheels, resulting in high stability. Large wheel diameters and tire widths control foot print pressures for suspension above soft and irregular surface conditions. Both folding chairs and folding carts of prior art remain generally large in volume even after folded for storage or transport. The described invention converts to a storage volume which is a very small fraction of it's practical use volume, an important attribute for portable or convertible equipment of any function.

PRIOR ART

By virtue of definition, aids to personal mobility will likely include the following key functional elements; light weight, compact size, and versatile use. Driven by sensitivity to these, broad analyses of prior art indicates inadequate satisfaction of the key functional criterion, and extensions thereto. Related collapsible wheeled chairs, tables, and carts are illustrated in the following United States Patents:

| U.S. PAT. NO. | INVENTOR | FILED DATE |
| --- | --- | --- |
| 4,645,262 | Furubotten | Feb 24, 1987 |
| 4,565,382 | Sherman | Jan 21, 1986 |
| 4,824,167 | King | Apr 25, 1989 |
| 4,824,137 | Bolden | Apr 25, 1989 |
| 4,824,127 | Stamm | Apr 25, 1989 |

SUMMARY OF THE INVENTION

This invention provides a cart capable of carrying heavy loads over irregular and soft surfaces, and serving as a chair, with folding, and snap apart disassembly which also will separate into component parts.

The invention includes a cart defined by a rigid truss supporting a flexible container capable of restraining loads from beneath and on the sides of the contents, and of providing a chair with back support. The cart is held basically upright by a pair of axle mounted free wheels at one end (the rear), and (retractable and alternately configured as fixed) leg stands at the other (the front). The chair is utilized by pitching the cart front upward in rotation about the axis of the wheel axle, until the truss at the cart back contacts the support surface (ground). The truss thusly maintains the unaltered original geometry of the cart while re-oriented for use as a chair. The flexible container partially deforms in-side-out (bottom, front, and side portions) from the outside generally convex surface of the cart, to a generally concave seat and back rest of the chair.

The truss element consists of a first frame and a second frame. Each frame is defined by two support struts and a connect strut. Each frame is configured generally in a U shape but may take alternate geometries which provide equivalent connectivity between struts and similar supporting features for the flexible container. The support struts resist vertical loading, projecting generally downward at each end of the generally horizontal connect struts, which resist lateral loads and support the flexible container at it's open end (top).

Near the ends of the first frame support struts the second frame support struts are pivotably mounted, preferably not at the ends of the second frame support struts, but not necessarily away from the ends. The two frames are secured at a relative angle of separation about the pivotal connection by tension elements of the flexible container which generally load the support struts in compression, and the connect struts and axle in bending and shear. Viewed from the side, the truss generally resembles a lower case "y" with wheel axle located near the end of the tail of the letter "y", which are the ends of the second frame support struts. Other geometries are considered similar when the struts of a truss structure are loaded in compression, bending, and shear, by hingedly flexible tensile elements. In this respect the invention is unique.

The flexible container generally but not necessarily describes a cubic space, a square prism, a trapezoidal prism a straight wedge, a tapered wedge, and the like, which have elements held in tension by generally U shaped truss frames similar to those previously described. The tension elements are supported by the connect struts and the axle. This description does not exclude any shape container, where separate structural elements are provided to act in tension to position and support the frames.

The cart/chair is folded and disassembled by separating connect struts and axle from support struts at the junctions thereto. The junctions feature finger actuated snap locks. When the first frame connect strut is separated, the tension elements are functionally detached from the support struts thereto, allowing relative rotation between the second frame and first frame support struts to an included angle of separation near zero. Alternatively, when the axle is separated, the tension elements are similarly detached from the support struts at the opposite end, allowing relative rotation between the second frame and first frame to an included angle of separation near zero. A basically low volume, flat package may thus be rolled, and in the alternate case carried; transported, stowed, and the like. When the second frame connect strut is separated, support struts thereto may be displaced from the functioning orientation of the vertical plane to reduce the occupied volume to that of the individual component parts.

The leg stands retract inside, alongside and similar, of the support struts of the first frame. The leg stands feature separate integral locking mechanisms to secure each, individually, in full extension, and complete retraction. In alternate configurations, leg stands are incorporated as the extended length of the first frame support struts.

Extended functions and features of the described invention also have preferred performance attributes. These include, but are not limited to: quick set up and disassembly without tools, open mesh, flexible, hinging panel and the like, container material with self cleaning and water drains, low footprint pressures of tire, tread, ski, float, and similar systems; for mobility over soft and irregular surfaces, slurries, powders, crystals, and liquids, material resistance to degradation by salt spray and sunlight, and sacrificial coatings, non-intrusive to impact with; yacht, aircraft, residential, automotive, and other finishes and coatings.

BRIEF DESCRIPTION OF THE DRAWINGS

FIG. 10 is an enlarged partial view in section taken along lines 10—10 of FIG. 7;

FIG. 10A is an enlarged partial view in section similar to FIG. 10 of the embodiment of an alternate configuration of wheel mounting;

DETAILED DESCRIPTION OF SEVERAL PREFERRED EMBODIMENTS

Figure 1:
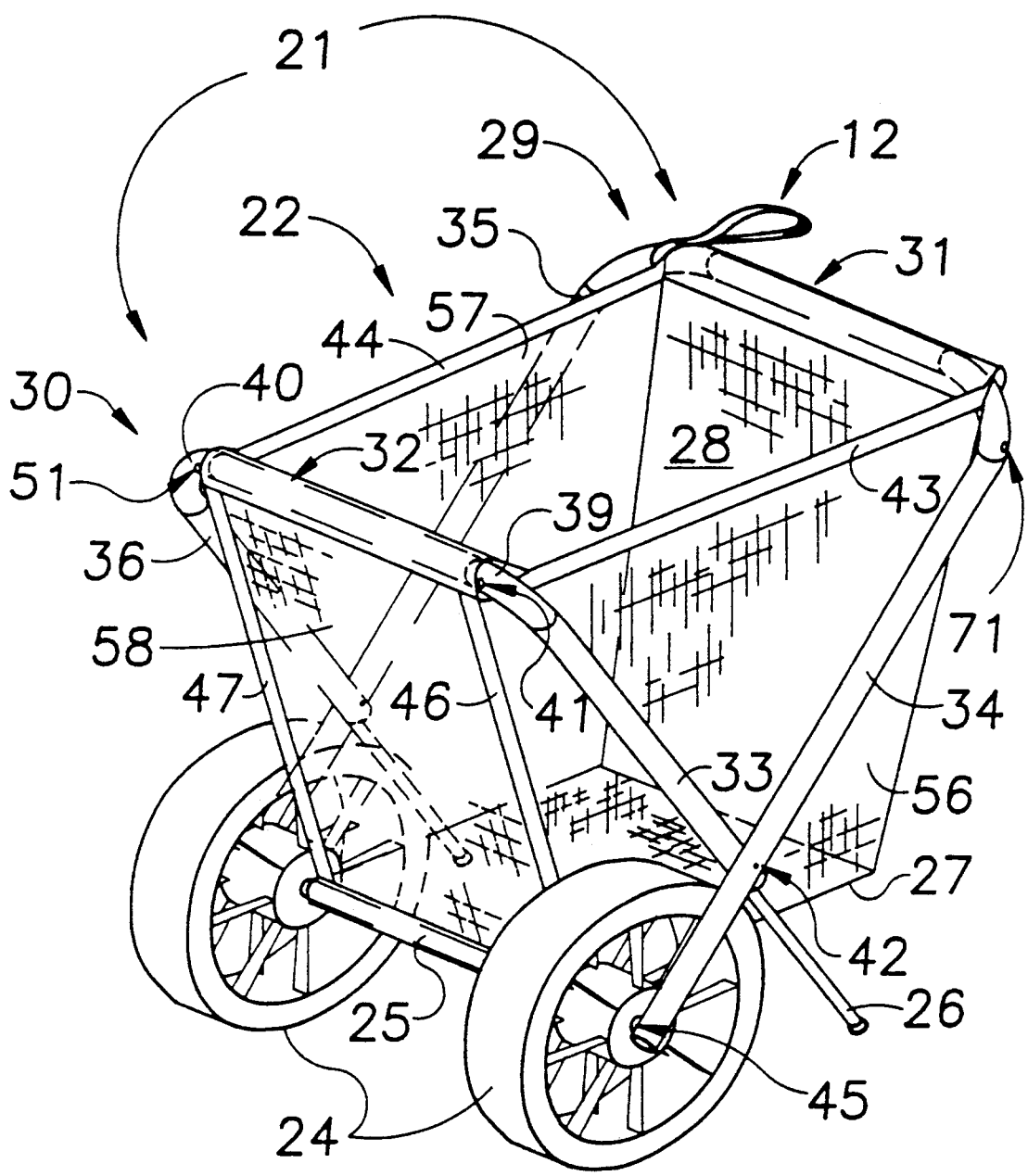
FIG. 1 is a perspective view of the cart/chair when in the cart orientation.

Referring to FIG. 1, a typical cart/chair embodying the subject invention is generally illustrated, consisting of a rigid truss 21 supporting a flexible container 22, and also may be known as a tote, hand cart, utility cart, caddy, and the like. A pair of broad pliable wheels 24 are mounted with an axle 25, supporting the rear of the cart. The front of the cart is supported by a pair of leg stands 26 when stationary. When moving, the leg stands 26 may be retracted, and lifted, for additional ground clearance, in which case the front is supported by external means. Moving support is provided at the front by the human hand grasping the strap appendage 12 and the like, fashioned to the connect strut 31, frames 29 and 30, and the like.

The truss 21 is constructed of a first frame 30, and a second frame 29. Each frame shares the similar features of support struts 33, 34, 35, 36 oriented downward generally in two vertical planes, and connect struts 31 and 32, oriented across, generally in the horizontal plane. The frames are generally U shaped. The open end of the first frame 30 being pinned by pivot connections at the lower ends of it's support struts to the span of the support struts 34 and 35 of the second frame 29. The open end of the second frame 29 is specified by connection at the lower ends of it's support struts 34 and 35 to each end of the axle 25. The frames 29 and 30 are held in angular position relative to each other by tension elements 43, 44, 46, and 47 located along the top of each side and each side of the back (corner line of back and each side) of the flexible container 22. The container 22 is defined by five distinct surfaces. These include the front 28, bottom 27, back 58, and sides 56 and 57.

Sleeve pockets fashioned in the flexible container 22 serve for attachment to connect struts 31 and 32, and the axle 25. Alternately the container 22 can be attached to the truss 21 using eyelets, screws, straps, snaps, zippers, buckles, and the like.

It is an embodiment of this invention that load forces carried by the connect struts 31 and 32, and the container 22, will be transmitted to support struts 33, 34, 35, and 36, and the axle 25, thence the wheels 24, and the leg stands 26 when stationary. With leg stands 26 retracted as during rolling of the loaded cart, support struts 33 and 36 will transmit forces to the support struts 34 and 35 so as to exert bending moments in the support struts 34 and 35. The bending moment is created by a force couple derived about the pivot connections 42, 92, by the tension elements 43, 44 and axle connections 45.

The flexural response of the struts 34 and 35 to the bending moment provides natural spring load suspension, dynamic damping is derived by proper material selection of struts 34 and 35. The innovation of this load suspension provides stable vehicle dynamics under heavy loads and at high speeds.

Construction of this embodiment includes materials which are lightweight and weatherproof. It is also preferable to utilize a soft finish which will scratch and shed, rather than damaging other objects with which it comes in contact.

Figure 2:
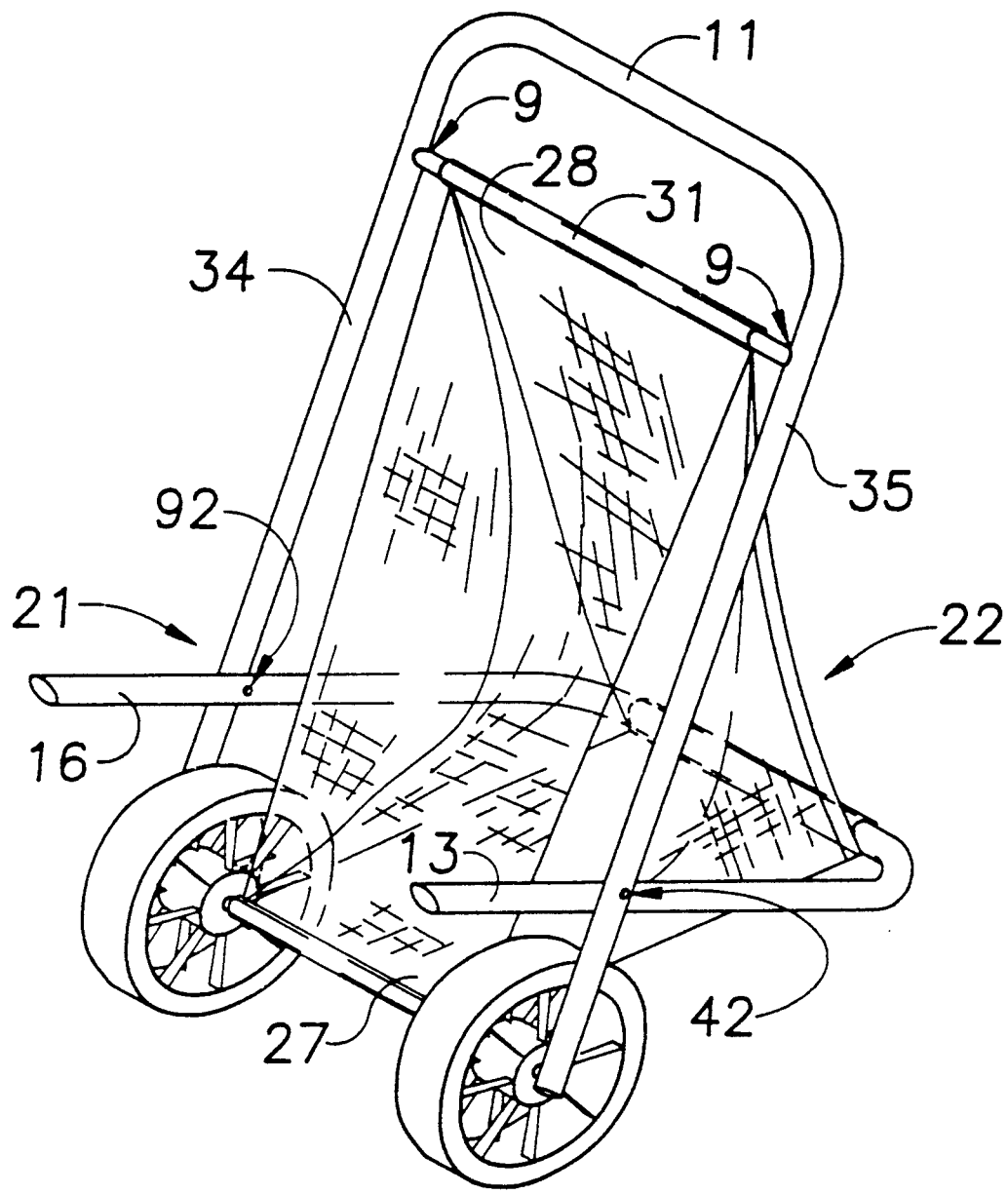
FIG. 2 is a perspective view of the invention in an alternate configuration illustrating the chair orientation.
Figure 2A:
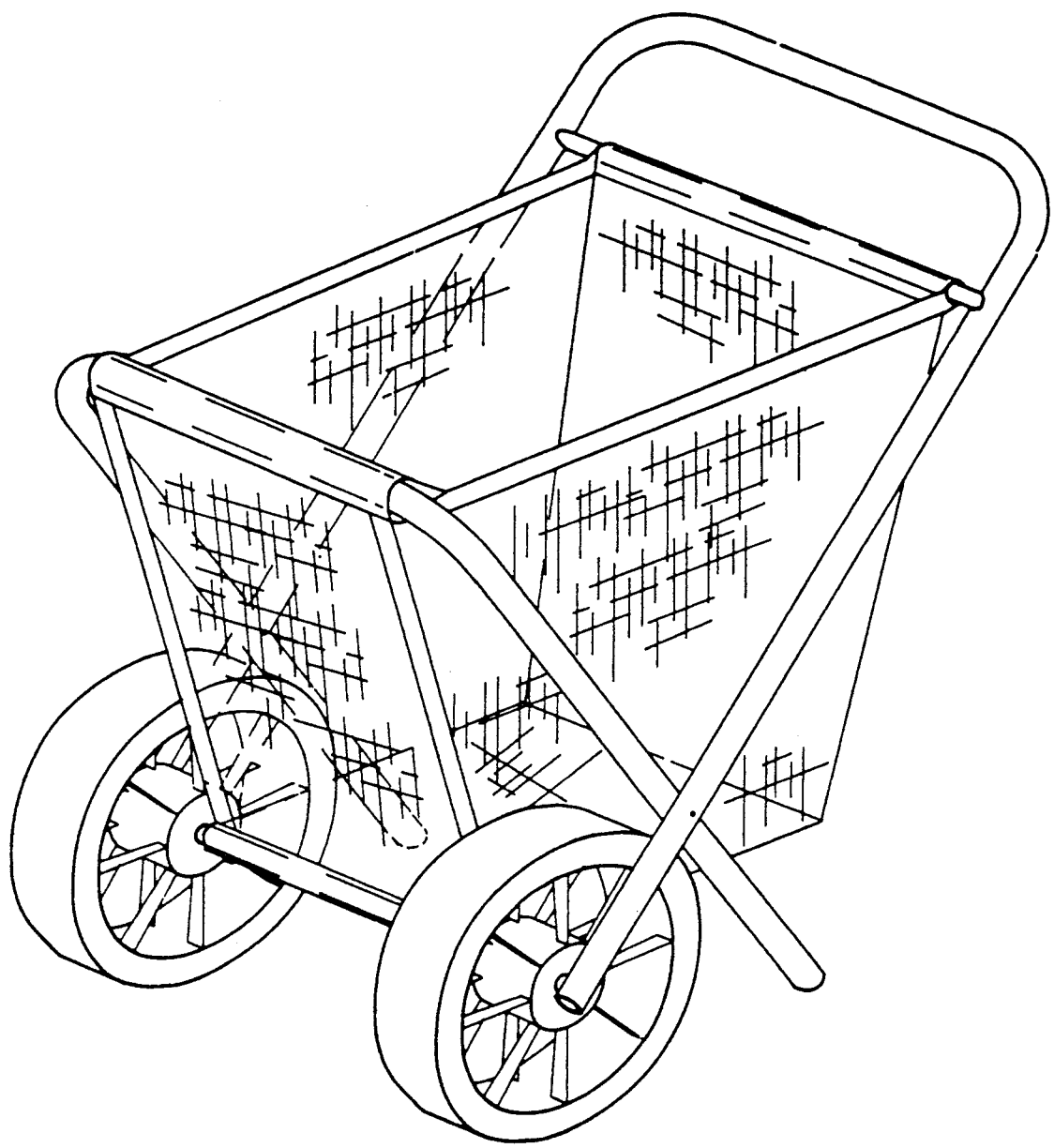
FIG. 2A is a perspective view of the invention in an alternate configuration illustrating of the cart orientation.

FIG. 2 illustrates an alternate configuration of the invention oriented in the embodiment as a chair viewed from the front and side perspectives and is also known as a beach chair, deck chair, patio chair, camp chair, and the like. The flexible container 22 provides a seat from it's bottom 27 and back rest from it's front 28. It is the embodiment of this invention that the seat 27 and back rest 28 are components of the flexible container 22, and that the rigid truss 21 remains generally unaltered, converting automatically for use as a chair, while the flexible container 22 will have a minimum of two positions in the areas of the container front 28 and bottom 27. FIG. 1 illustrates one position likely when the cart is carrying a load in the flexible container 22. FIG. 2 depicts a second position of the container 22 most typical when oriented as a chair capable of seating a person on the bottom 27, functioning as a seat, and the front 28, functioning as a chair back rest.

In this alternate configuration, the connect strut 31 is inserted through holes 9 defined near upper ends of support strut 34 and 35. A second cross member 11, is integral to both support struts 34 and 35 comprising the handle function in one alternate configuration. Alternate configurations of support struts 13 and 16 extend beyond pivot connections 42 and 92 comprising alternate configuration to the leg stands 26 of FIG. 1.

Figure 3:
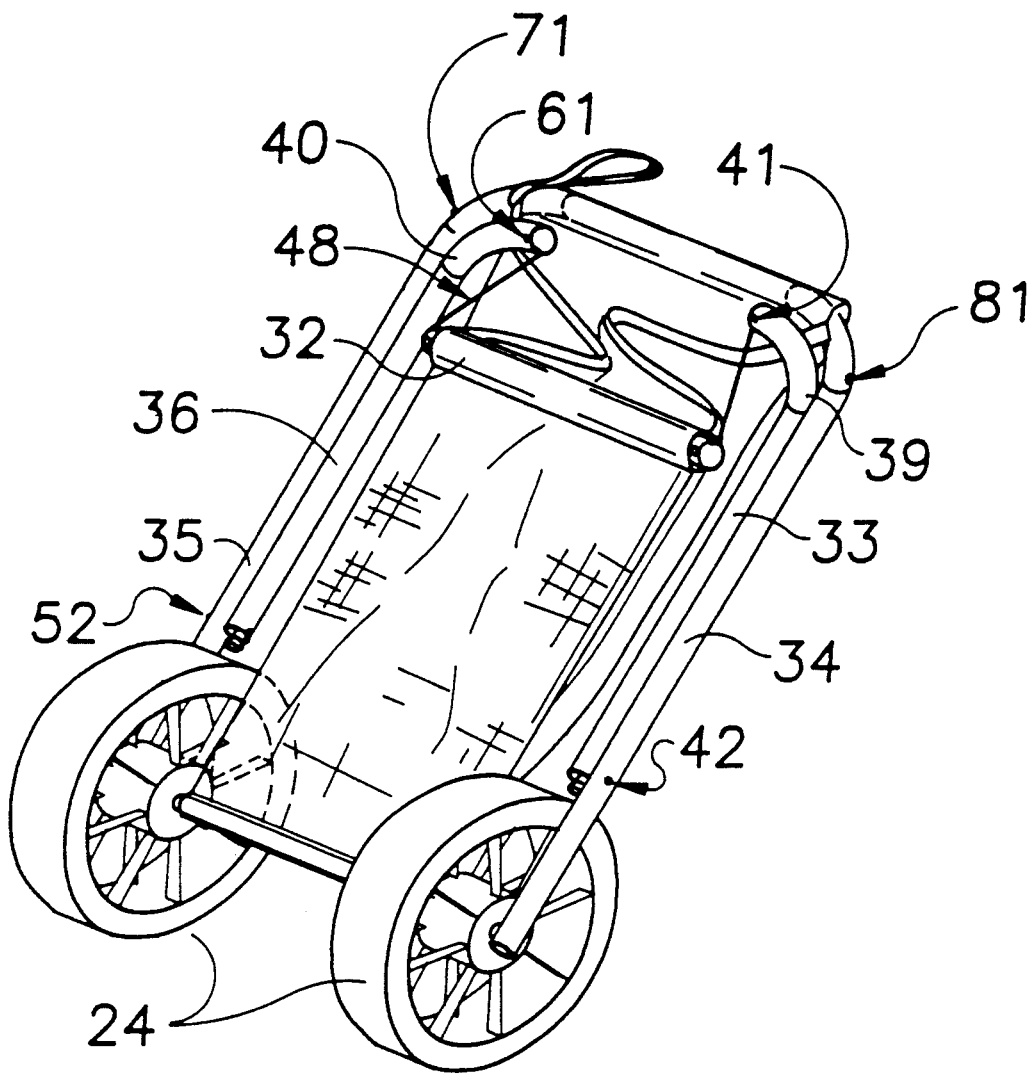
FIG. 3-3A is a perspective of the invention, illustrating the folded mode typical for transporting and storing.
Figure 3A:
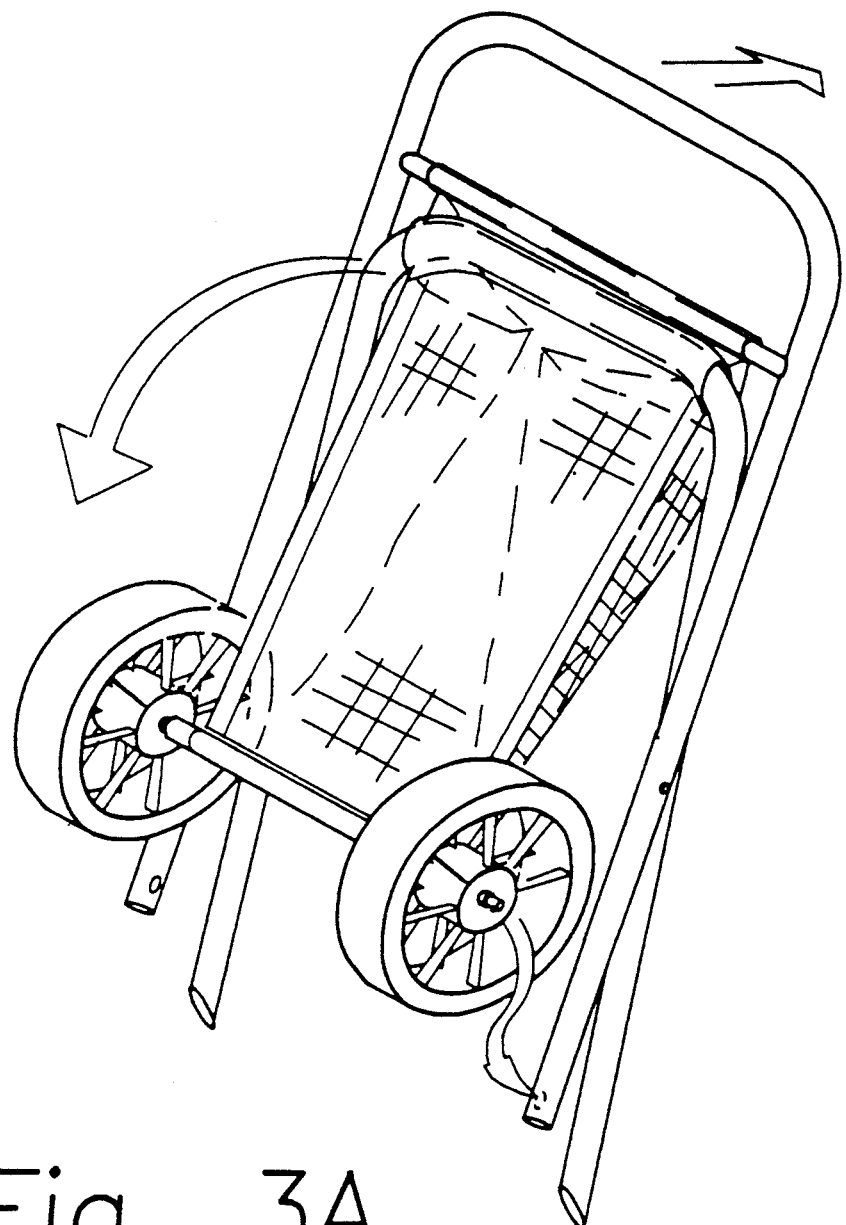

FIG. 3 indicates the embodiments of the invention of FIG. 1 capable of folding for quick and easy transport. In order to attain the folded configuration shown in FIG. 3, connect strut 32 is separated at the snap lock junctions 39 and 40 from the support struts 33 and 36. Supports struts 33 and 36 are then rotated away from the wheels 24, to an angular position of approximately zero degrees relative to the support struts 34 and 35. The elastic member 48 retains disassembled connect strut 32 to the assembly.

Figure 9:
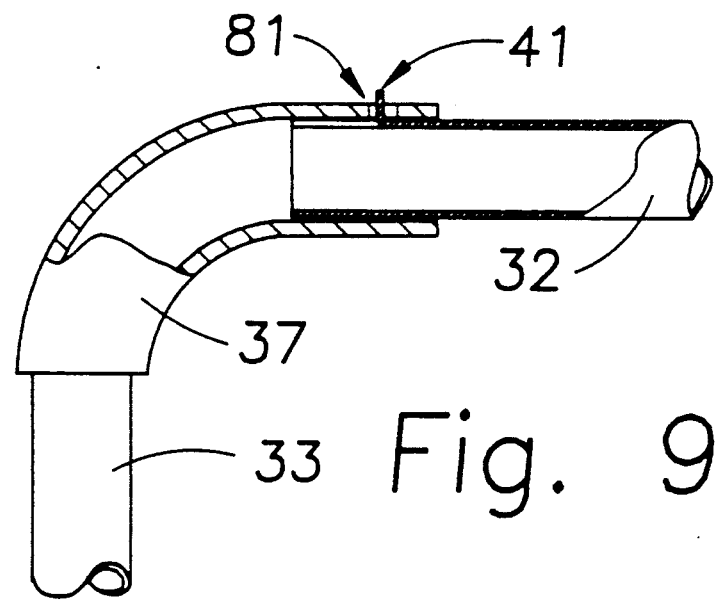
FIG. 9 is a partial view partly in section and partly in elevation of the snap lock junction taken along lines 9—9 of FIG. 8, showing the assembled condition.

The action of this separation is demonstrated by FIG. 9. Separation is affected by depressing the buttons 41 and 61 while extracting the connect strut 32 from the snap lock junctions 39 and 40. Referring to FIG. 1 and FIG. 3, once the connect strut 32 is separated, the support struts 33 and 36 are thusly rotated until the included angle relative to support struts 34 and 35 is approximately zero. The flexible container 22 may then be compressed and folded to nest within the second frame 29 and first frame 30.

Figure 4:
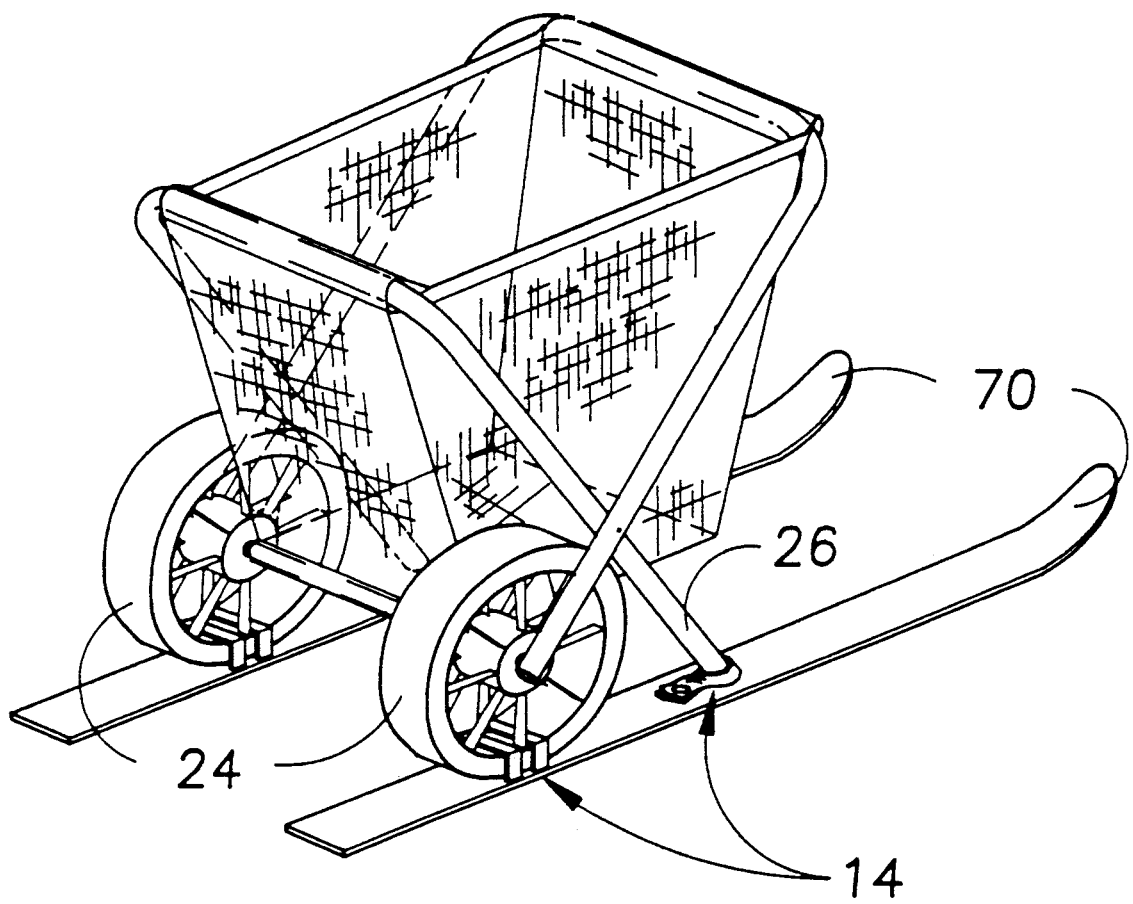
FIG. 4 exemplifies another embodiment of this invention and is a perspective view of the cart orientation when attached to motive means alternate to rolling.

FIG. 4 illustrates alternate motive function for the embodiment of FIG. 1. The suggested configuration creates a sled for use on snow, ice, mud, powder, and water by simple attaching the wheels 24 and leg stands 26 to the skis, toboggan, sledge, floats, identified by reference numeral 70, by suitable straps and brackets 14. As such, the contents of the cart are elevated above the zone of spray contamination from the surface.

Figure 1A:
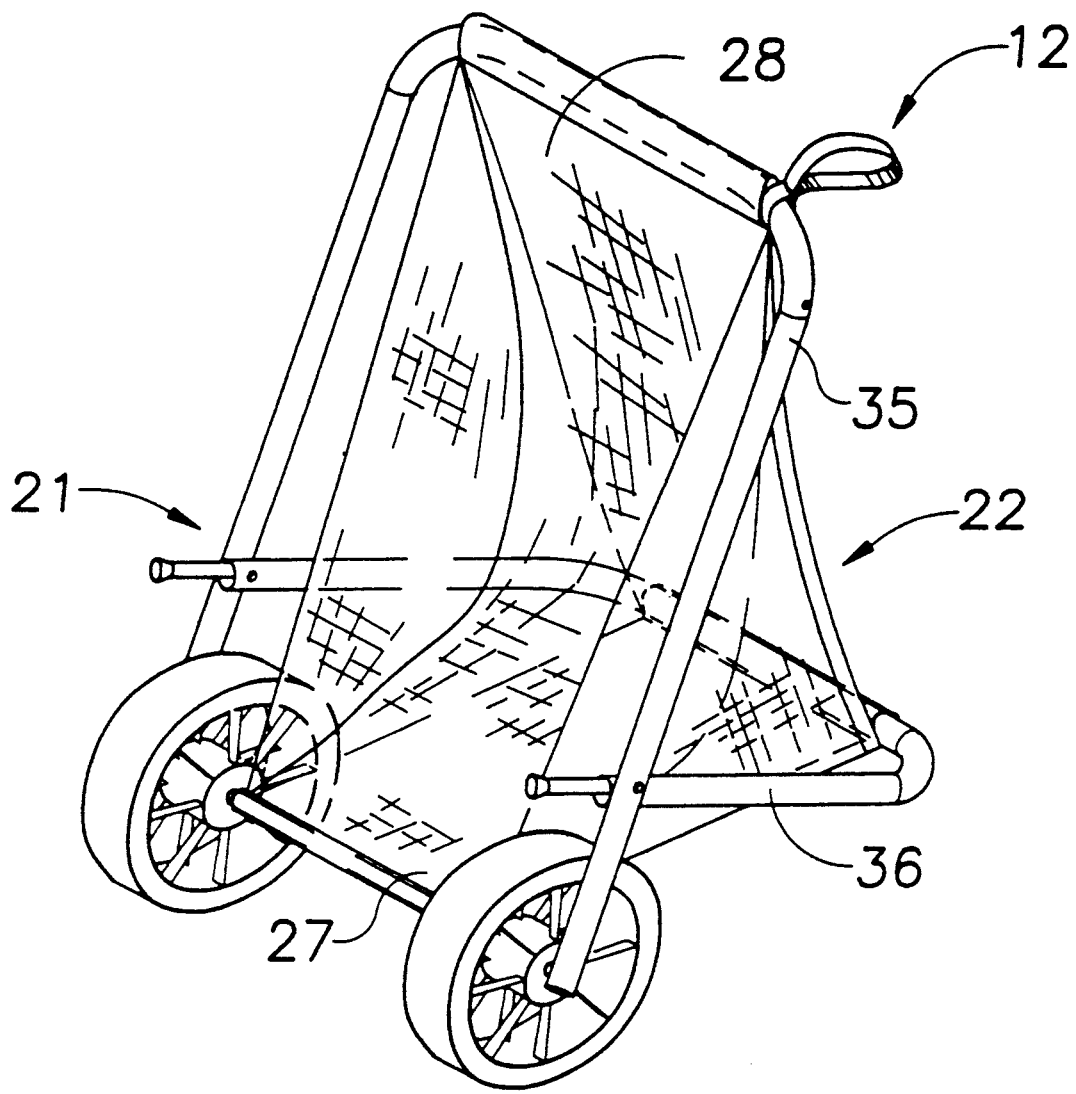
FIG. 1A is a perspective view of the cart/chair when in the chair orientation.
Figure 5:
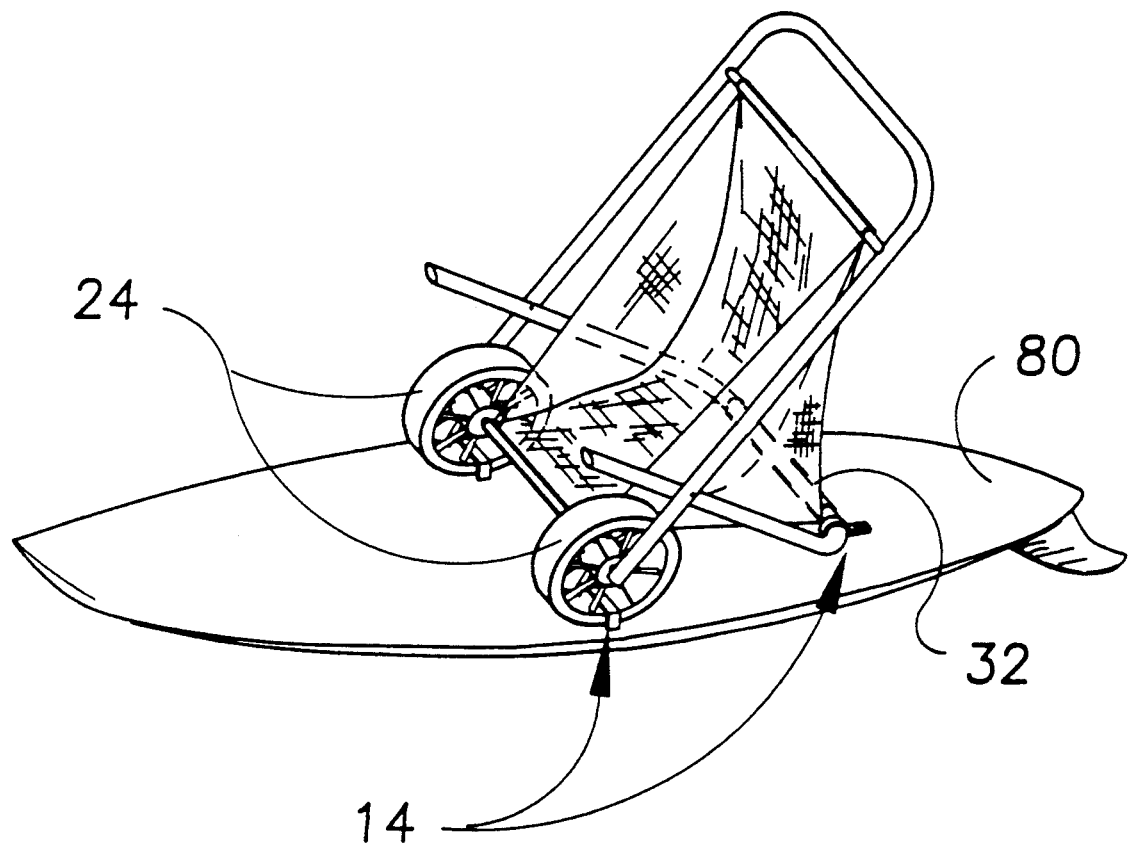
FIG. 5 exemplifies another embodiment of this invention and is a perspective view of the chair orientation (FIG. 2) when attached to motive means alternate to stationary.

FIG. 5 illustrates alternate motive function for the embodiment of FIG. 2. The suggested configuration creates a sled for use on snow, ice, mud, powder, water and the like through simple lashing 14, bracket connections and the like of the wheels 24 and connect strut 32 to the skis, toboggan, sledge, floats, and the like 80. As such the chair becomes a light weight rescue device and recreational vehicle. For example, after carrying a second surf board to the water using the cart embodiment of FIG. 1, the configuration of FIG. 5 may be fashioned from the chair of FIG. 1A and FIG. 2 and the surf board 80, providing a comfortable vessel which is paddled, canoe, kayak, and similar style.

Figure 6:
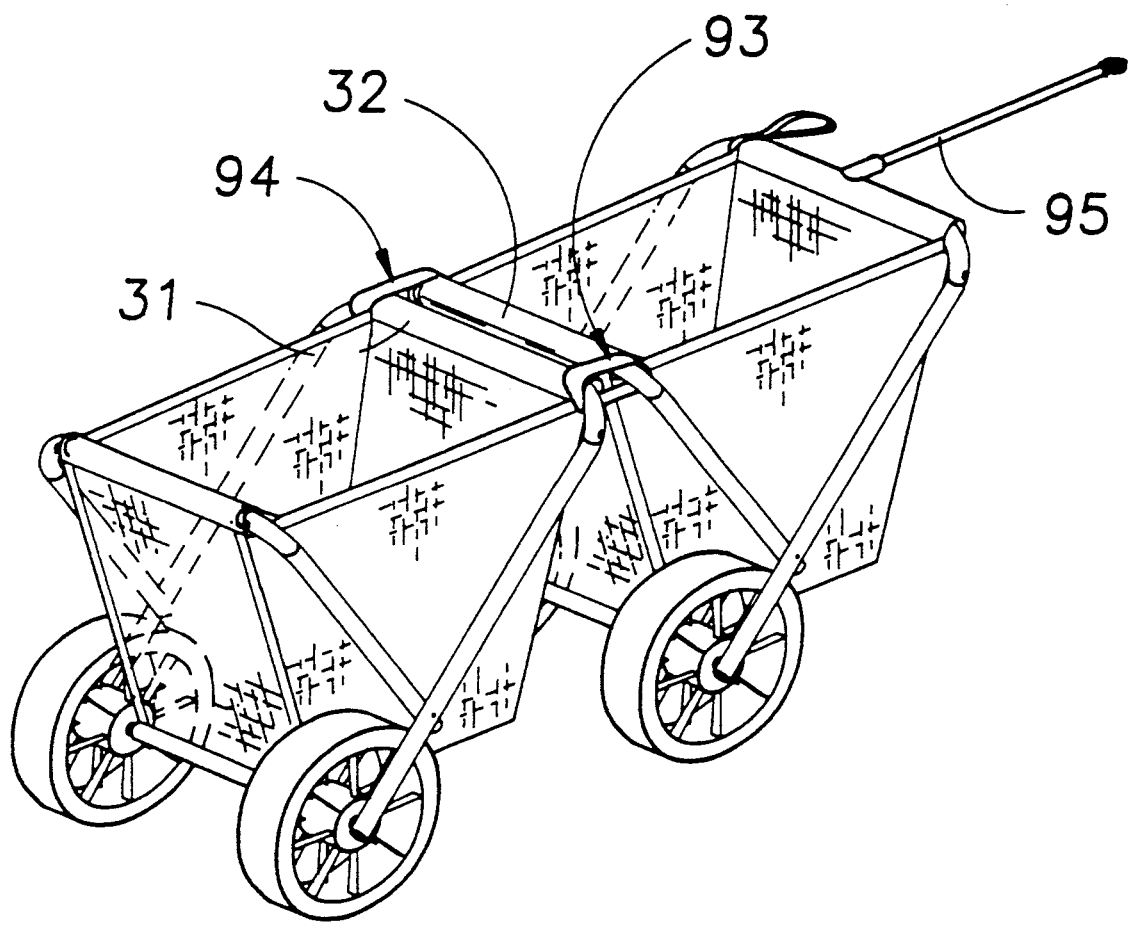
FIG. 6 exemplifies another embodiment of this invention and is a perspective view of two of the carts linked together.

FIG. 6 illustrates alternate motive function for the embodiment of FIG. 1. The suggested configuration offers mobility over discontinuous and irregular terrain which may not be serviced by the alternate configuration of FIG. 4. Such is the case for high friction surfaces of dry ice, concrete, dry mud, rock, deep fine powder, sand and soil, which is both irregular and creviced. To prevent the tendency of each cart to rotate around each respective axle quick connect straps 93, 94 may be used to attach the adjacent connect struts 31 and 32 together. The convertible tow bar 95, is used for pulling, pushing, and controlling one and multiple carts. Load division using multiple carts modularizes logistics, and reduces foot print pressures, decreasing rolling resistance, with additional loads.

Figure 7:
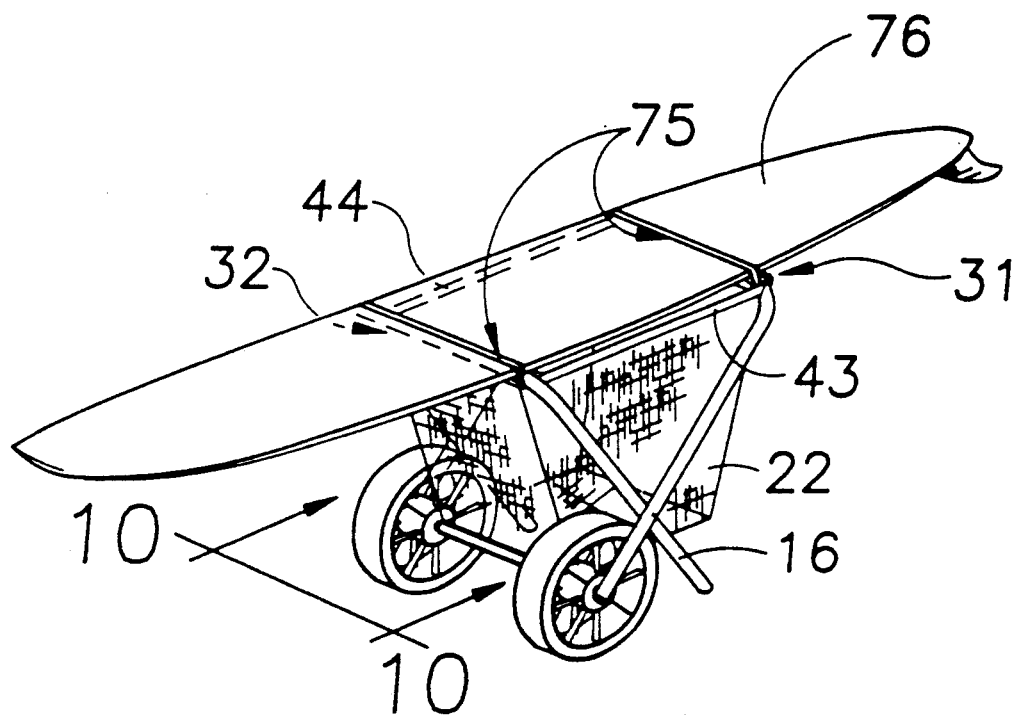
FIG. 7 exemplifies another embodiment of this invention and is a perspective view of the cart used for carrying oversized loads, such as a surfboard.

FIG. 7 illustrates the invention embodiment of FIG. 1 in an exemplary use with an over hanging load 76, with alternate fixed leg stands 16. Such loads may be oriented longitudinally as shown, resting on the connect struts 31 and 32, and laterally, supported by the tension members 43 and 44 of the flexible container 22. Tie down members 75 secure the load to the cart.

Figure 8:
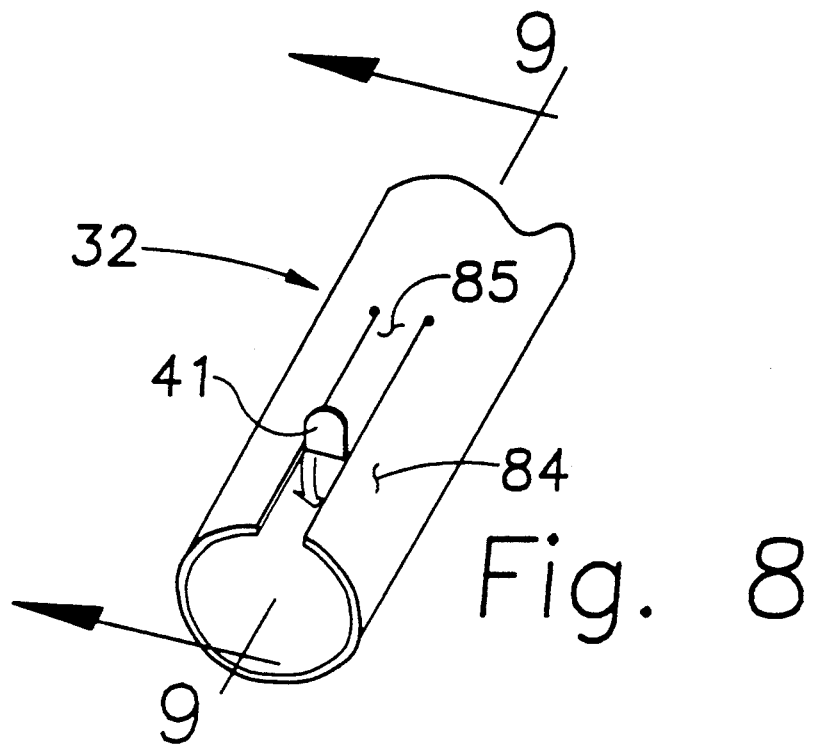
FIG. 8 is a partial view in perspective illustrating a snap lock junction, male component.

FIG. 8 and FIG. 9 show details of the invention of FIG. 1 such that the preferred embodiments will allow separation of component parts for compact storage. Snap lock junctions 37, 38, 39, and 40 allow total separation of support struts 33, 34, 35, and 36 from connect struts 31 and 32. The drawings show detail of a preferred configuration snap lock junction 37, 38, 39, and 40. The connection consists of coaxial slip fit of the support struts 34 and 35, and connect strut 32, within the inner clearance space of the snap lock junctions 37, 38, 39, and 40. The resulting fit resists bending, shear, and compression. Torsion and tension are resisted by the button feature 41, generally represented as a disparity of the surface 84 located on a deflecting member 85 of the connect strut 32, and support struts 34, and 35, in alignment such that the button feature 41 will insert through the hole 81 provided in the junctions 37, 38, 39, and 40. The deflecting member 85 consists of a cantilever arm formed by stamping, machining, molding, secondary attachment and the like. Similarly, the button feature 41 is formed by stamping, machining, molding, secondary attachment as in a round headed rivet and the like.

FIG. 10 indicates another feature of the embodiment of the invention of FIG. 1 and FIG. 2. Wheel 24, mounted on each end of axle 25 is disposed either inboard of or outboard of support struts 34 and 35. FIG. 10 illustrates the inboard mounting as well as quick disconnect feature. Tubular spacers 00 concentrically mounted about axle 25, serve to space the lateral distance between wheels 24. Male pin 95, and complimentary female hole 91, formed near the end axle 25, snap lock the axle within junction hole 92. Removal of the wheel for disassembly of the cart is by depressing male pin 95, disengaging the pin from female hole 91 and sliding the wheel and axle apart from each other and from the junction hole 92.

FIG. 10A shows one alternate design indicated by wheel 24 mounting outboard of the support struts 34 and 35, secured with additional hub washer 18, bayonet cap, cotter key, hitch pin, threaded nut and the like.

Figure 11:
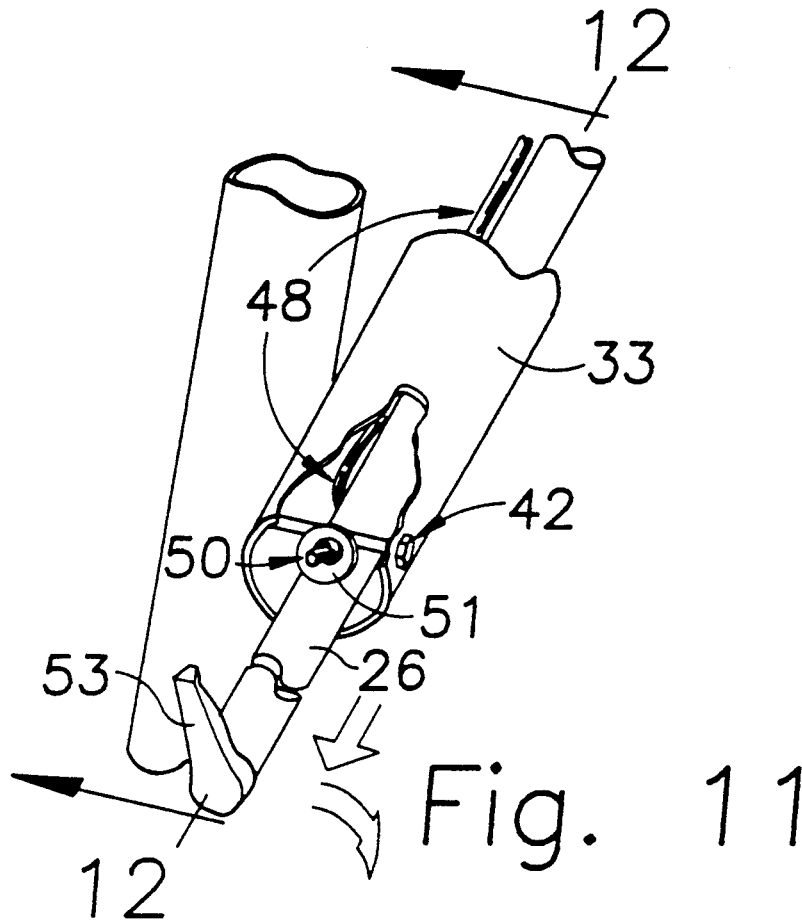
FIG. 11 is a perspective view illustrating the locking and retracting leg stand of the cart of FIG. 1.
Figure 12:
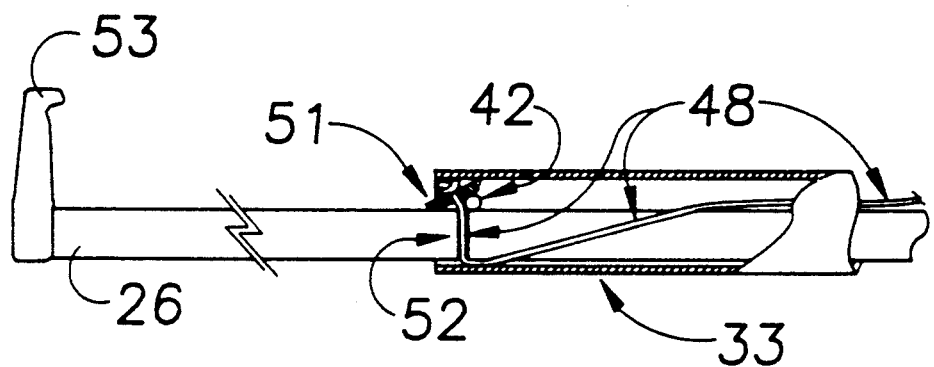
FIG. 12 is a partial view in section taken along lines 12—12 of FIG. 11.

FIG. 11 and FIG. 12 indicate a feature of the embodiment of the invention of FIG. 1. These figures illustrate the method of locking, unlocking and retracting the leg stand 26. The bevel washer 51 is captured between the leg stand 26 and knot 50 at the termination of the elastic member 48. This configuration is achieved by passing the elastic member 48 through a hole 52 in the leg stand 26 and the bevel washer 51. The leg stands 26 may be rotated within the support struts 33 and 36 to an angle which allows clearance of the diameter of the bevel washer 51 beneath the pivot pin 42. Once the leg stand 26 has been extracted so that the bevel washer 51 is outside of the pivot pin 42, the leg stand 26 is rotated so that the bevel washer is approximately in the plane of the pivot pin 42. The leg stand 26 is slightly retracted, allowing the bevel washer 51 to climb onto the pivot pin 42 until the pivot pin 42 registers against the elastic member 48. The bevel washer 51 registers against the leg stand 26 at its outer diameter, and the pivot pin 42, near it's inner end, held in approximate position under tension of the elastic member 48. Activation in reverse unlocks the system allowing self retraction of the leg stand 26 under the spring force of the elastic member 48. The preferable design of this configuration allows foot operation without stooping to activate by hand. A feature contributing to ease of foot activation is the end lever 53 which may have various geometries. The prime consideration of it's design being to provide adequate strength and friction for rotation and extraction by leverage with the human foot. The benefit of the illustrated geometry is the ease with which the leg stand 26 is rotated from the locked to the unlocked positions. Alternate end lever 53, lanyards, straps, and the like will provide equivalent function.

FIG. 12 illustrates an extension of the embodiment of FIG. 3 where the elastic member 48 is internally routed from connection at one end to the leg stand 26 internally through the first frame to connection with the opposite leg stand 26. Thus routed, the elastic member 48 serves to retract and retain the leg stands 26, and also retain the frames 29 and 30 during folding. The preferred embodiment of FIG. 11 shows connection of the elastic member 48 to the leg stand lock 49. In this configuration, leg stand 26 extended, the bevel washer 51 registers against the leg stand 26 at it's outer end, and the pivot pin 42, at it's inner end, held in position by the normal force exerted by the elastic member 48. The bevel washer 51 is captured between the leg stand 26 and knot 50 at the termination of the elastic member 48.

Figure 13:
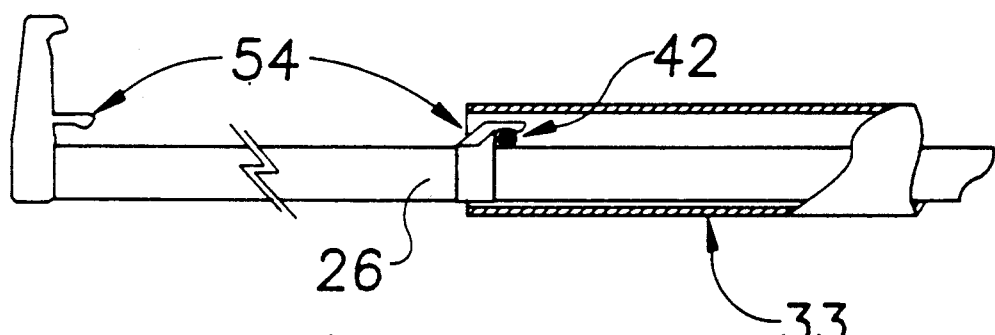
FIG. 13 is an a view partly in section and partly in elevation illustrating an alternate locking and retracting leg stand.

FIG. 13 illustrates one alternate leg stand locking and retaining device. The spring snap hook 54 is molded, stamped, machined, fastened and the like into the leg stand 26.

Several preferred embodiments are described including some alternate configurations, without intent to restrict this specifications in its scope or variation from the illustrative disclosures or uses mentioned, except by departure from the spirit and alignment of the following claims.

I claim:

1. A rigid truss and integral flexible container serviceable as a combination cart and chair that converts to a folded stowage, comprising:
   means formed from flexible material having a front panel, a bottom panel, a back panel, and opposing side panels defining an open top container in the cart position and a chair in the chair position,
   truss means comprising a first frame and a second frame,
   said first frame having first and second downwardly projecting support struts,
   said second frame having third and fourth downwardly projecting support struts,
   a first connect strut transversely connecting said first downwardly protecting support strut and said second downwardly projecting support strut at one end therebetween,
   a second connect strut transversely connecting said third downwardly projecting support strut and said fourth downwardly projecting support strut adjacent one end therebetween,
   said first connect strut and said second connect strut being disposed substantially parallel relative to each other in said cart position and in said chair position,
   pivoting means including a first pin for pivoting said first support strut to said third support strut,
   additional pivoting means including a second pin for pivotally connecting said second support strut to said fourth support strut, said first pin and said second pin being in co-axial relationship relative to each other, said first and second frames folding thereon for a storage position,
   a pair of support plane-contacting wheels,
   a wheel supporting axle affixed to the lower ends of said third support strut and said fourth support strut of said second frame for rotatably mounting said pair of wheels thereon,
   a first pair of tension elements integral with said flexible material means between said truss means upper end front and back, restraining an erected span of said first frame and said second frame therebetween,
   a second pair of tension elements integral with said flexible material means between said truss means upper end back and lower end back dependent with said wheel supporting axle, restraining said first and second frames from folding therebetween,
   leg stand means on said first and second support struts of said first frame to support plane contacting thereto, and
   connecting means integral with said flexible material means for attaching opposing ends of said flexible material means to said first connect strut and said second connect strut whereby said flexible means forms a container in the cart position and is inverted inside-out to form a chair in the chair position.

2. A chair, comprising:
   a truss means of claim 1, disposed in the erected geometry of said cart having a second stable orientation of said truss means with said second connect strut in contact with said support plane and said first and second support struts disposed upward out of contact with said support plane, said first frame position relative to said second frame position substantially consistent with said cart position,
   a second position of said flexible material means, and having said bottom panel, said front panel, and said opposing side panels partially reversed inside-out, defining a chair seat and back rest.

3. The cart and chair of claim 1, comprising:
grasping means connected to one end of said truss means.

4. The cart of claim 1, comprising:
towing means having at least one tow bar rigidly connected to said truss, whereby said truss can be hauled by vehicular and nonvehicular means.

5. The cart of claim 1, comprising:
a first and second downwardly projecting leg stand disposed substantially parallel,
said first and second leg stands having retractable positions within said first and second support struts providing self support of said cart when stationary, and providing clearance from said support plane during travel, and
a first elastic means providing retraction force of said first leg stand to said first support strut, and a second elastic means providing retraction force of said second leg stand to said second support strut, respectively therebetween.

6. The cart of claim 1, wherein said cart carries loads extending over the top of said flexible material means, comprising:
a pair of flexible supports securing said loads and being connected to said truss means.

7. The leg stands of claim 5, defining arm rests in said chair orientation.

8. The cart of claim 1, wherein the folded stowage comprises:
releasable interconnection of said second pair of tension elements at said truss means upper end back relieving restraint to said erected span of said first frame and said second frame whereby said first and second frames hingedly fold approximately within the same plane.

9. The cart of claim 1, having six locating and releasable male-female snap lock junctions comprising:
a male pin means laterally projected from a male component of said male-female snap lock junction with spring mounting therebetween,
a female hole positioned laterally in a female component of said male-female snap lock junction,
said male pin means of said male component projecting into said female hole of said female component aligned and releasably locked there-within,
a first male-female snap lock junction releasably interconnecting said first support strut to said first connect strut transversely adjacent one end therebetween,
a second male-female snap lock junction releasably interconnecting said second support strut to said first connect strut transversely adjacent one end therebetween,
a third male-female snap lock junction releasably interconnecting said third support strut to the wheel supporting axle transversely adjacent one end therebetween,
a fourth male-female snap lock junction releasably interconnecting said fourth support strut to the wheel supporting axle transversely adjacent one end therebetween,
a fifth male-female snap lock junction releasably interconnecting said fourth support strut to said second connect strut transversely adjacent one end therebetween, and
said first, second, third, fourth, fifth, and sixth releasable snap lock junctions providing general disassembly of said cart and chair to minimum volume for storage and transport thereof.

10. The male pin means of claim 9, formed integrally with each end of said first and second connect struts, said first second, third, and fourth support struts, and wheel supporting axle,
said male pin means including a cantilever supported spring lever to permit reseating of said male pin means to said female hole, when deployed.

11. The cart of claim 1 comprising:
a resilient loosely attached cord interconnecting said first and second connect struts, and said first, second, third, and fourth support struts when disassembled.

12. The leg stands of claim 5, comprising a frictionally engageable end fitting means whereby engagement by external means provides rotation to permit retraction of said leg stands.

13. The flexible material means of claim 1, including local stiffening means attached to said side panels and said bottom panel, for stress distribution and controlled deformation thereof.

14. The cart and chair of claim 1 comprising:
extending length third and fourth support struts and a third connect strut rigidly mounted transverse therebetween and above said second connect strut, for grasping.

15. The cart of claim 1, including multiple carts wherein said carts connect in series front to back comprising:
a pair of flexible supports attached to said truss means of each cart, connecting the front of one cart to the back of another cart whereby the front cart supports and guides the back cart.

16. The cart and chair of claim 1 wherein the folded stowage comprises:
releasable interconnection of said second pair of tension elements at said truss lower end back, relieving restraint to said erected span of said first frame and said second frame whereby said first and second frames hingedly fold approximately within the same plane.

* * * * *